March 2, 1926.

L. H. PETERS 1,575,384

METHOD OF AND APPARATUS FOR TESTING CANS

Filed Feb. 18, 1924 2 Sheets-Sheet 1

INVENTOR.
LOUIS H. PETERS.
BY

ATTORNEYS.

March 2, 1926.

L. H. PETERS 1,575,384

METHOD OF AND APPARATUS FOR TESTING CANS

Filed Feb. 18, 1924 2 Sheets-Sheet 2

INVENTOR.
LOUIS H. PETERS.
BY
ATTORNEYS.

Patented Mar. 2, 1926.

1,575,384

UNITED STATES PATENT OFFICE.

LOUIS H. PETERS, OF OAKLAND, CALIFORNIA.

METHOD OF AND APPARATUS FOR TESTING CANS.

Application filed February 18, 1924. Serial No. 693,556.

REISSUED

*To all whom it may concern:*

Be it known that I, LOUIS H. PETERS, a citizen of the United States, residing at Oakland, county of Alameda, and State of California, have invented new and useful Improvements in Methods of and Apparatus for Testing Cans, of which the following is a specification.

This invention relates to can machinery and particularly pertains to a rotary tester for filled cans.

At the present time it is in most instances difficult to determine when a filled can is leaking or when its seams are sufficiently weak so that the can may afterwards leak due to the action of the material contained therein. It is common practice to test the cans by a hand testing device, or by a device which will puncture the can. Both of these methods are objectionable, in that the operation is costly and requires considerable time, and when the cans are punctured destroys the can thus tested and only permits an occasional can down the complete run to be tested.

It is the object of the present invention, therefore, to provide an automatic rotary tester which will test each can as it comes from the double steamer or cooker, and to positively insure that all faulty cans may be rejected.

The present invention contemplates testing cans by creating a suction action on the end of the cap which will be sufficient to distend the end of the cap against the internal vacuum of the can, which, if the can has been properly sealed, will cause the cap to snap back to its original position, said testing action being brought about by the use of a rotary structure embodying a spider for spacing the cans, and means operating the opposite sides of said spiders to hold the cans and to create a suction upon the ends of each can as they are carried by the spider, after which the cans are ejected.

The invention is illustrated by way of example in the accompanying drawings, in which.

Figure 1:
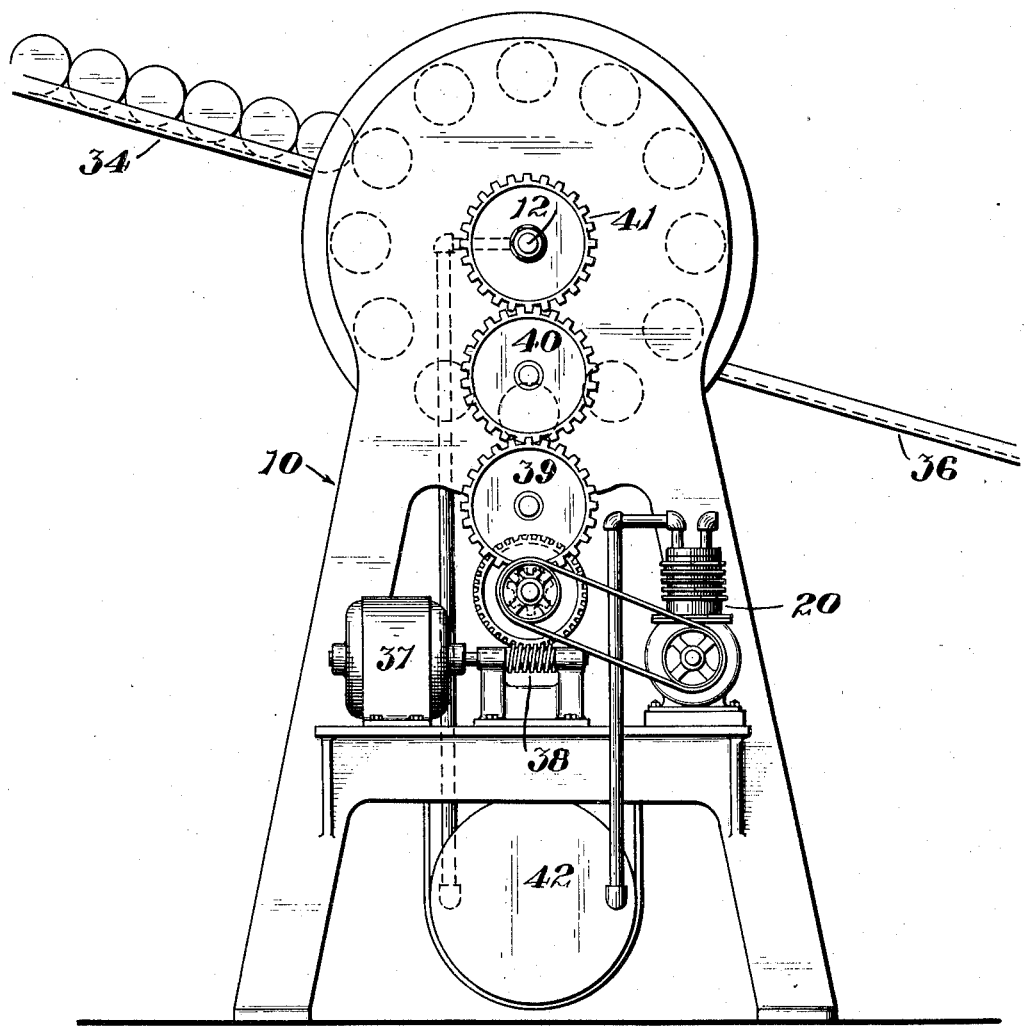
Fig. 1 is a view in side elevation showing the complete device.
Figure 2:
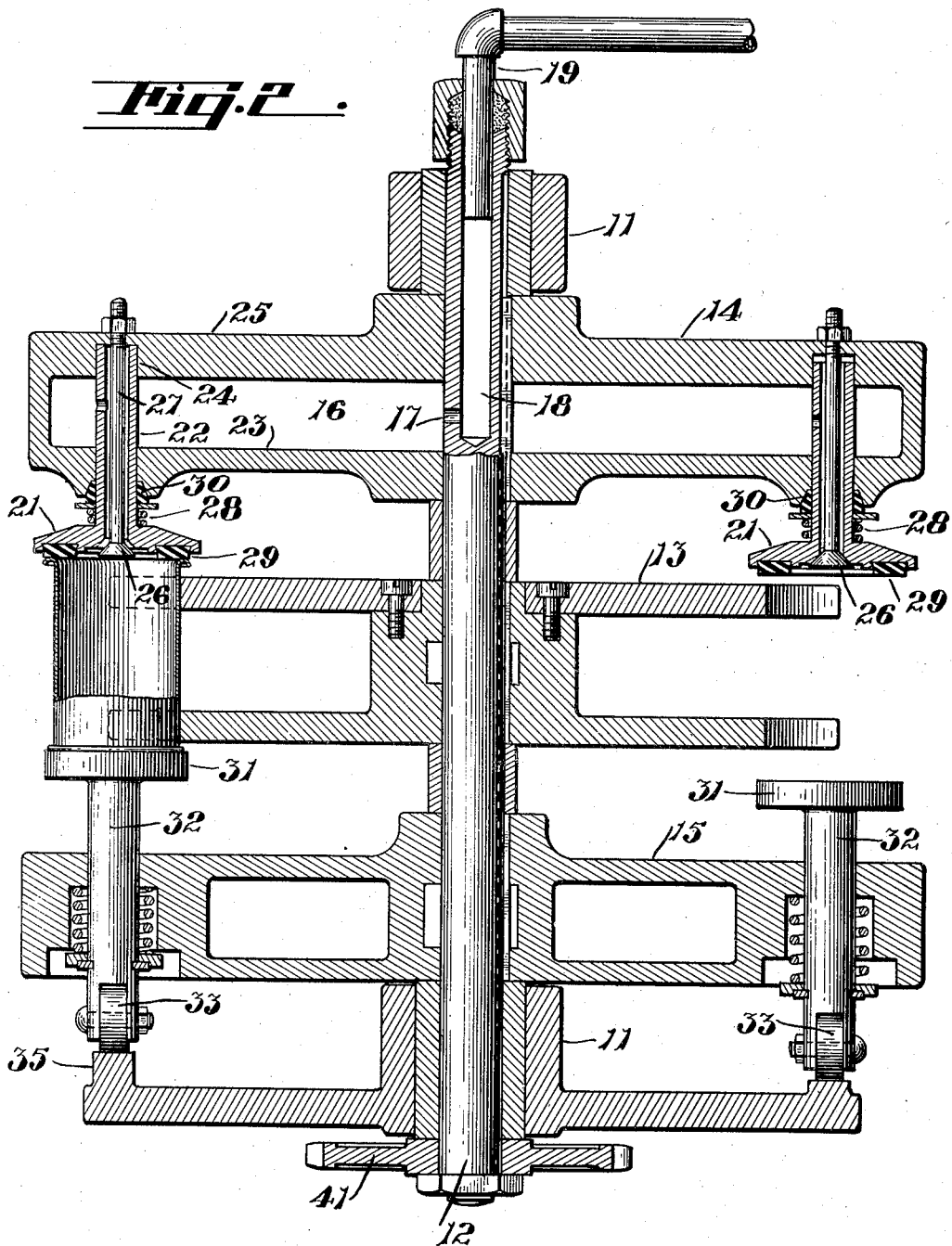
Fig. 2 is an enlarged view in central transverse section through the rotary head of the device indicating the manner in which cans are tested to disclose a satisfactory and faulty can.

Referring more particularly to the accompanying drawings, 10 indicates a supporting base which may be of any desired configuration, and which is fitted with horizontally disposed bearings 11. These bearings receive a shaft 12 upon which are mounted a spider 13 and a pair of rotary heads 14 and 15. The spider and the heads which are disposed upon opposite sides thereof are all fixed and rotate in unison with the shaft 12. The head 14, which will be hereinafter designated as a suction head, is formed with a hollow suction chamber 16 in communication through a bore 17 with a counterbore 18 formed in the end of the shaft 12. This counterbore is directly connected by a suction pipe 19 with a suction pump 20 suitably supported upon the frame 10 of the machine.

Mounted upon the suction head 14 are a plurality of chucks 21 which are carried upon spindles 22 extending through the wall 23 of the suction head, across the chamber 16, and into a counterbore 24 in the opposite wall 25 of the suction head. The spindles 22 are hollow and communicate with an opening through the chuck plates 21. The lower end of this opening is formed with a beveled face to receive a tappet valve 26, the stem 27 of which extends through the spindle 22 and projects outwardly through an opening in the wall 24 of the head, the stem being adjustable by its threaded end. This valve will be opened as chuck plate 21 moves to compress spring 28 when chuck plate 31 moves with a can.

The face of the chuck plate 21 is fitted with a packing gasket 29 adapted to rest against the rim of a can and cap, as for example, the double seamed portion of the can and cap, so that an air-tight joint may be created between these two parts, as a packing gasket 30 is also fitted around the spindle 22 to prevent leakage of air from within the chamber 16 of the head 14.

The spider 13 is formed around its circumferential edge with a plurality of semicircular recesses adapted to receive the cans and to properly position them relative to the chuck plate 21. This member also acts as a timer, in that it receives the complete flow of cans and causes the cans to be automatically positioned relative to the various chuck plates 21.

The rotary head 15 carries a plurality of movable chuck plates 31. These plates are adapted to bear against the opposite end of the cans and are supported by reciprocating spindles 32 which project through bearings in the rotary head 15. Their terminating ends are fitted with rollers 33 which are intended to pursue a course of travel along a circular face cam having a swell thereon sufficient to move the chuck plates 31 toward the fixed plates 32, and to thus rigidly clamp a can and hold it in position between the chuck plates 21 and 31 while being advanced by the rotary structure. The cans are clamped in position after they have been delivered to the spider 13 from the chute 34, this action being brought about by the rise on the face of cam 35 along which the rollers 33 are passing. The cam will release the rollers, of course, when the chucks reach the point where the cans are to be taken off the machine and passed along the runway 36.

The period during which the cam 35 is effective is the same period as that of the cam 28 which actuates the valve members 26 and permits such an action to be exerted against the cap of the can.

The structure is operated by any suitable driving means, as for example, the motor 37, which drives a worm gear 38 in turn rotating gears 39 and 40. The gear 40 is in mesh with a gear 41 fixed on the central shaft 12 of the tester. Suitable gearing also connects the compressor 20 with the motor so that a continuous suction action will be exerted through the tank 42 and the conduit 19.

In operation of the present invention, the device is assembled as shown in the drawings and a complete machine is driven by the motor 37. A flow of cans is delivered to the chute 34, which cans will find seats within recesses of the spider 13. As the rotary head revolves, the roller 33 of the chuck will encounter the swell portions of the cam, thus causing the chuck plate 31 to clamp the can against the gasket 29 of the opposite chuck plate 21. The valve 26 will be moved from its seat and will cause a suction action to be exerted on the end of the cap through the chamber 16 of the rotary member 14, which action will tend to draw the cap outwardly so that it will assume a distended position.

When the can reaches the chute 36 it will be ejected onto the chute after the chuck 31 has been retracted and the valve 26 has moved to its closed position.

If it so happens that the can is sealed perfectly tight, the atmospheric pressure on the outside of the can and the vacuum within the can will cause the distended cap to snap back into its normal position. If the can leaks, this action will not take place and an operator may then segregate and reject the faulty cans which will all appear with the cap on the tested end of the can permanently distended. It will be understood that due to the multiplicity of spindles and pairs of chucks, a number of cans may be tested in rapid succession, and a machine of great capacity thus produced.

It will thus be seen that the structure here disclosed will act effectively and rapidly to test cans without mutilating the cans, while permanently indicating their condition after the test and permitting them to thus be readily segregated.

While I have shown the preferred form of my invention as now known to me, it is to be understood that various changes may be made in its construction without departing from the spirit of the invention as shown in the appended claims.

Having thus described my invention, what I claim and desire to secure by Letters Patent is:

1. A method of testing filled cans consisting in forming a seal around the edge of a closed can end, thereafter creating suction upon a portion of the can end embraced by the seal, whereby the end of the can will be distended, after which the distension of the end will remain permanent if the can is faulty.

2. An apparatus for testing filled cans comprising a member adapted to fit against the edge of a closed end of a can, means for creating sufficient suction between the member and the closed can end whereby the can end will be distended, and will remain distended when said suction is interrupted if the can is faulty.

3. An apparatus for testing leaks in filled cans, comprising a pair of chucks fitting against the opposite closed ends of a can and between which the can may be clamped, one chuck bearing against the edge of the can end only and means for creating sufficient suction between the last named chuck and the adjacent can end whereby said can end will become distended and will remain distended if the can is faulty after said suction has been interrupted.

4. A rotary can tester comprising a can feed chute, a rotary spider having recesses in its circumferential edge for receiving the successive cans from the feed chute, a pair of heads one disposed at each side of said spider and rotating therewith, pairs of complementary chucks carried by said heads and adapted to clamp against the opposite ends of a can, means for automatically producing said clamping action, means for automatically creating a suction action between one of the chucks of each pair and the can head against which it is clamped, whereby the end of the can will become distended, and if faulty, will remain so after the suction has been interrupted, and means for carrying the tested can away from the machine.

LOUIS H. PETERS.